United States Patent Office 3,532,683
Patented Oct. 6, 1970

3,532,683
CATIONIC MONO AZO DYES FOR
ANIONIC FIBERS
Mario F. Sartori, Wilmington, Del., assignor to E. I. du
Pont de Nemours and Company, Wilmington, Del., a
corporation of Delaware
No Drawing. Filed June 27, 1966, Ser. No. 560,867
Int. Cl. C07c *107/06;* D06p *1/02*
U.S. Cl. 260—207
4 Claims

ABSTRACT OF THE DISCLOSURE

Water-soluble, cationic, azo dyes, for example [p-(2-benzamido - 4 - dimethylaminophenylazo)phenacyl]trimethylammonium chloride, useful for dyeing anionic fibers and prepared from m- or p-aminophenacylammonium salts and m-carbonamido or m-sulfonamido anilines.

The introduction of anionic fibers, such as the acid-modified polyacrylic fibers disclosed in U.S. Pats. 2,837,500 and 2,837,501, the acid-modified polyester fibers disclosed in U.S. Pat. 3,018,272 and the acid-modified nylon fibers disclosed in U.S. Pat. 3,184,436, has necessitated the development of cationic dyes for coloring these fibers. For yellow to red shades, several water-soluble, cationic azo dyes have been disclosed as suitable.

In U.S. Pat. 2,821,526, S. N. Boyd, Jr. discloses water-soluble, cationic azo dyes which are suitable for dyeing polyacrylic fibers. These dyes are of the general formula:

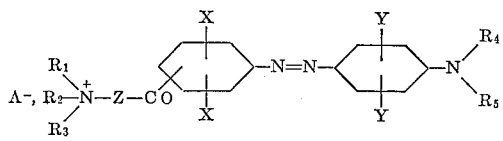

wherein, by way of summary, $R_1$, $R_2$ and $R_3$ are alkyl or substituted alkyl groups, $A^-$ is the anion of a water-soluble acid, Z is a short-chain alkylene radical, X and Y are hydrogen, lower-alkyl, chlorine, bromine or alkoxy, $R_4$ and $R_5$ are hydrogen, lower-alkyl, hydroxyalkyl, acetoethyl, cyanoethyl or phenyl. These azo dyes have been found to possess good wash- and light-fastness when used for direct dyeing of polyacrylic fibers or union fabrics containing such fibers.

The Boyd patent, however, admits one weakness in said dyes, namely that they possess the properties of indicators and may undergo a shade change when applied to polyacrylic fibers. Actually the shade of dyeing will generally vary from yellow to red depending on the hydrogen-ion concentration of the dye bath employed.

Polyacrylic fibers are normally dyed with a dye bath having a pH of about 4.5 to 5. However, when the polyacrylic fiber is blended with other fibers such as in union fabrics, it is sometimes necessary to alter the pH of the dye bath to accommodate requirements of the other fabrics present. For example, when the union fabric contains wool, strongly acidic dye baths having pH's as low as about 2 may be required to apply the wool dye to the wool. Cationic dyes which do not change shade under these conditions are required to dye the polyacrylic fibers in these fabrics.

The appearance of new polyacrylic fibers on the market has further increased the requirement for cationic dyes having good proton stability, that is, which do not change shade under strongly acidic conditions. These new fibers are made from polymers containing about 3 to 20%, based on the weight of the polymer, of a haloalkyl phosphate as described in U.S. Pat. 3,149,089, and are heated during the crimping process as described in British Pat. 1,007,620, published Oct. 13, 1965. Such fibers treated in this manner sometimes develop high acidity which causes a change in the shade of many cationic azo dyes. Accordingly, proton stable dyes are required for use with these fibers.

It is also desirable to have dyes which are shade stable under neutral-to-alkaline conditions as well as acid conditions. For example, acid-modified nylon fibers and union fabrics of polyacrylic and cotton fibers are frequently dyed under neutral-to-alkaline conditions with cationic dyes and a combination of cationic and direct dyes, respectively.

All of the cationic dyes now on the market are deficient in one or more properties. Several dyes which are stable at pH's as low as about 2 lack the desired degree of brightness and tinctorial strength. In other case, the dye is stable at pH 2 and has good brightness and tinctorial strength, but lacks shade stability under neutral-to-alkaline conditions.

It is an object of this invention to provide water-soluble cationic azo dyes for dyeing the aforementioned fibers in orange to bluish-red shades which are particularly characterized by shade stability over the entire range of pH 2 to 9. It is another object to provide such dyes which also possess good brightness and tinctorial strength. These and other objects will become apparent from the following description of this invention.

It has now been found that hydrolytically stable, water-soluble, cationic azo dyes of excellent shade stability, in addition to having good light- and wash-fastness, brightness and tinctorial strength, are provided by compounds of the formulae:

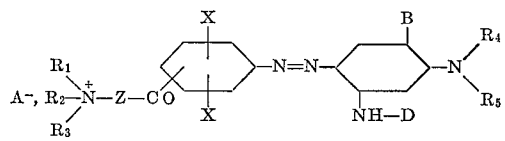

and

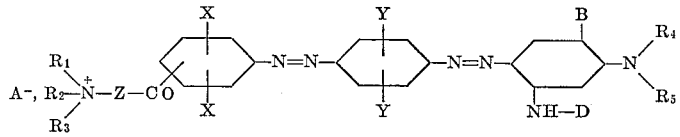

wherein $R_1$ is alkyl, $R_2$ is alkyl or hydroxyalkyl, $R_3$ is alkyl, hydroxyalkyl or monocyclicaralkyl, or $R_1$, $R_2$, and $R_3$ together with the adjacent nitrogen atom from a pyridinium ring; $A^-$ is a water-solubilizing anion; Z is an alkylene radical of 1 to 3 carbon atoms; each X is hydrogen, alkyl, alkoxy, chlorine or bromine; each Y is hydrogen, alkyl, alkoxy, chlorine or bromine, said Y's being para to each other when neither of them represents hydrogen; B is hydrogen, alkyl, alkoxy, chlorine or bromine; D is —CO—alkyl, —CO—aryl, —SO₂—alkyl, —SO₂—aryl, —COCF₃ or —COCH₂Cl, in which the aryls may be substituted by alkyl, alkoxy, nitro or chlorine; $R_4$ is hydrogen, alkyl, hydroxyalkyl, alkoxyalkyl, cyanoalkyl, acetoxyalkyl, acetylethyl, alkoxycarbonylalkyl or 2-(alkoxycarbonyloxy)ethyl; $R_5$ is hydrogen, alkyl, hydroxyalkyl, alkoxyalkyl, cyanoalkyl, acetoxyalkyl, acetylethyl, alkoxycarbonylalkyl, 2 - (alkoxycarbonyloxy)ethyl or phenyl; all alkyl, hydroxyalkyl, cyanoalkyl and alkoxy members are of 1 to 4 carbon atoms; and the CO group in the diazo component is attached in the meta or para position with respect to the azo bridge.

Preferred dyes of this invention are of the formulae:

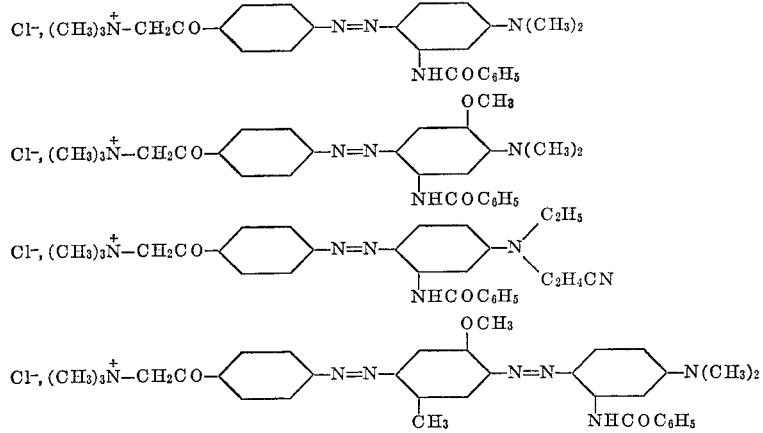

The dyes of this invention are distinguished from the dyes of the Boyd patent in that they are derived from a 3'-amino- or substituted 3'-amino-acylanilide coupling component. Quite unexpectedly, these dyes are superior to those of the Boyd patent in proton stability of shade as shown by the following tabulated results of experiments with 1% dyeings on "Orlon" 42 polyacrylic fiber using dyes of the formula:

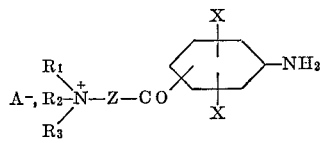

| Q | Shade at pH 5 | pH at which shade changes |
|---|---|---|
| Boyd dye -- —CH$_3$ | Red | 4 |
| Novel dye -- —NHCOC$_6$H$_5$ | Red | below 2 |

Furthermore, the monoazo dyes of this invention may be modified by interposing another phenylazo group between the azo bridge and the coupling component, without affecting their shade stability.

In spite of the above difference in structure, the novel monoazo compounds of this invention may be prepared by the same general procedure described for the compounds in the Boyd patent. For instance, the monoazo compounds may be prepared by diazotizing in conventional manner a monoquaternary diamine of the formula:

$$A^-, R_2-\overset{+}{N}-Z-CO-\underset{X}{\underset{|}{\bigcirc}}-NH_2$$
$$R_1, R_3$$

wherein A$^-$, R$_1$, R$_2$, R$_3$, Z and X have the significance indicated above, and coupling the resulting diazo component with a 3'-amino- or substituted 3'-amino-acylanilide in acidic aqueous medium at or below room temperature, and preferably at about 5° to 20° C. Suitable water solubilizing anions represented by A$^-$ include chloride, bromide, sulfate, phosphate, acetate and p-toluenesulfonate ions. Chloride ions are preferred for economic reasons.

The novel diazo compounds of this invention may be prepared by coupling the diazo component, obtained as above, to a compound of the formula:

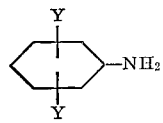

wherein Y is as defined above, then diazotizing again and coupling, as above, to a 3'-amino- or substituted 3'-amino-acylanilide. The final monoazo and disazo dyes thus produced are only sparingly soluble in cold water, particularly in the presence of salt, and thus may be recovered directly by filtration.

The starting monoquaternary diamines may be prepared as in Examples IX, XI, XII, XIV(a) and XV(a) of the Boyd patent. The coupling components are prepared by well known methods, preferably by alkylation of the 3'-amino-acylanilide or its derivatives such as anisidides, etc. Coupling components may also be prepared by (1) alkylation of m-nitroaniline or its ring-substitution products followed by reduction and acylation, or (2) by acylation of m-nitroaniline or its ring-substitution products followed by reduction of the nitro group.

Application of the novel dyes to acid-modified polyacrylic, nylon and polyester fibers may be made from an acid aqueous bath at about pH 4 to 5 at customary dyeing temperatures of about 80° to 100° C. Application to union fabrics containing one of the above synthetic fibers and wool is carried out advantageously at about 100° C. in a dye bath containing about 2%, by weight of the fiber, of glacial acetic acid, 2% of sodium acetate and 2% of a non-ionic surface active agent such as a condensation product of oleyl alcohol or cetyl alcohol with ethylene oxide.

Dyeings obtained with the novel dyes of this invention are bright, fast and hydrolytically stable in addition to being shade stable. These dyes also exhibit good build-up to heavy shades.

The following examples, illustrating the novel dyes of this invention and their preparation, are given without any intention that the invention be limited thereto. All parts and percentages are by weight.

EXAMPLE I (a) A solution of 2.28 parts of (p-aminophenacyl)-trimethylammonium chloride in 28 parts of water and 3.5 parts of 36% aqueous hydrochloric acid is cooled to 5° to 10° C., and the amine is diazotized by the addition of 0.7 part of sodium nitrate. An excess of nitrous acid is maintained in the solution for 30 minutes as indicated by the KI-starch paper test and is then removed by the addition of a small amount of sulfamic acid. This diazo solution is then slowly added during about 30 minutes to a stirred aqueous solution containing 2.12 parts of 3'-aminobenzanilide in 25 parts of a mixture of acetic and propionic acids in a ratio of 5:1. The slurry is stirred at 5° C. for 1 hour then caustic is added to raise the pH of the reaction mass to 4. The agitation is continued at 5° C. for 8 hours. The precipitate is then filtered off, washed with 10% sodium chloride solution and dried.

The product thus obtained, having the structure

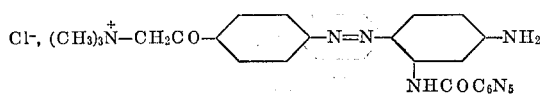

is a red powder, which is readily dissolved in warm water to give a red solution. This compound dyes sulfonate-modified polyacrylic fiber from an acidic dye bath in red shades of good fastness properties. The absorption maximum of a solution of this compound in methanol is at 472 millimicrons.

(b) Part (a) of this example may be repeated by replacing the (p - aminophenacyl) - trimethylammonium chloride with:

(1) 2.4 parts of [2-(p-aminobenzoyl)ethyl]trimethylammonium chloride, prepared as described in Example XIV(a) of the Boyd patent,
(2) 3.4 parts of [3-(p-aminobenzoyl)propyl]triethyl-ammonium bromide, prepared by the method disclosed by H. W. Linnell and S. V. Vora in the Journal of Pharmacy and Pharmacology, vol. 4, No. 1 (1952), pages 62–64, or
(3) 2.4 parts of (p-amino-α-methylphenacyl)trimethyl-ammonium chloride, prepared as described in Example XV(a) of the Boyd patent to give similar products which dye sulfonate-modified polyacryclic fiber in red shades.

EXAMPLE II (a) A solution of diazotized (p-aminophenacyl)tri-methylammonium chloride, prepared as described in Example I, is slowly added during about 30 minutes to a stirred solution of 2.4 parts of 3'-(dimethylamino)benz-anilide in 15 parts of a 15% aqueous hydrochloric acid solution. The reaction mass is stirred at 5° C. for 1 hour then caustic is added to raise the pH to 4. The agitation is continued for 5 hours at 5° C. The precipitate is filtered washed with 20% sodium chloride solution and dried. The new dye has the formula:

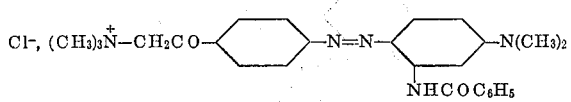

The product thus obtained is a red powder which dyes sulfonate-modified acrylic fiber in bright red shades of very good fastness properties. The shades remain unchanged when the pH of the dye bath is raised from 2 to 9. The absorption maximum of this compound in methanol is at 500 millimicrons.

(b) Part (a) of this example may be repeated by replacing the 3'-(dimethylamino)benzanilide with an equal molar amount of either (1) 3'-(diethylamino)acetanilide or
(2) 3'(dimethylamino)propionanilide to give similar red dyes.

EXAMPLE III

By following the procedure of Example I, diazo components selected from the following:

(a) (p-aminophenacyl)trimethylammonium chloride,
(b) [2-(p-aminobenzoyl)ethyl]trimethylammonium chloride,
(c) [3-(p-aminobenzoyl)propyl]triethylammonium bromide,
(d) (p-amino-α-methylphenacyl)trimethylammonium chloride,
(e) (3-amino-4-methylphenacyl)trimethylammonium chloride,
(f) (3-amino-4-methoxyphenacyl)trimethylammonium chloride,
(g) (4-amino-2-chlorophenacyl)trimethylammonium chloride,
(h) (4-amino-2,5-dimethylphenacyl)trimethylammonium chloride,
(i) (p-aminophenacyl)pyridinium chloride;
(j) (p-aminophenacyl)benzyldimethylammonium chloride and
(k) (p-aminophenacyl)dimethyl(2-hydroxyethyl)-ammonium chloride may be coupled with the coupling components listed in Table I below to give orange to bluish-red dyes which exhibit good tinctorial strenth and good light- and wash-fastness properties on polyacrylic fibers.

(1) 

(2) 

(3) 

(4) 

(5) 

(6) 

(7) 

(8) 

(9) 

(10) 

(11) 

(12) 

(13) 

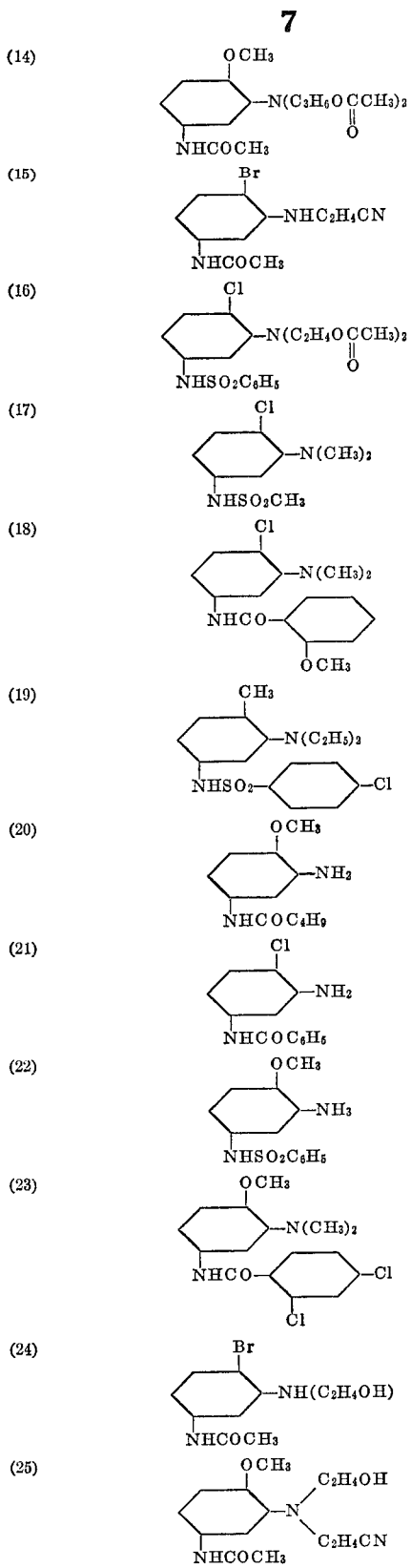
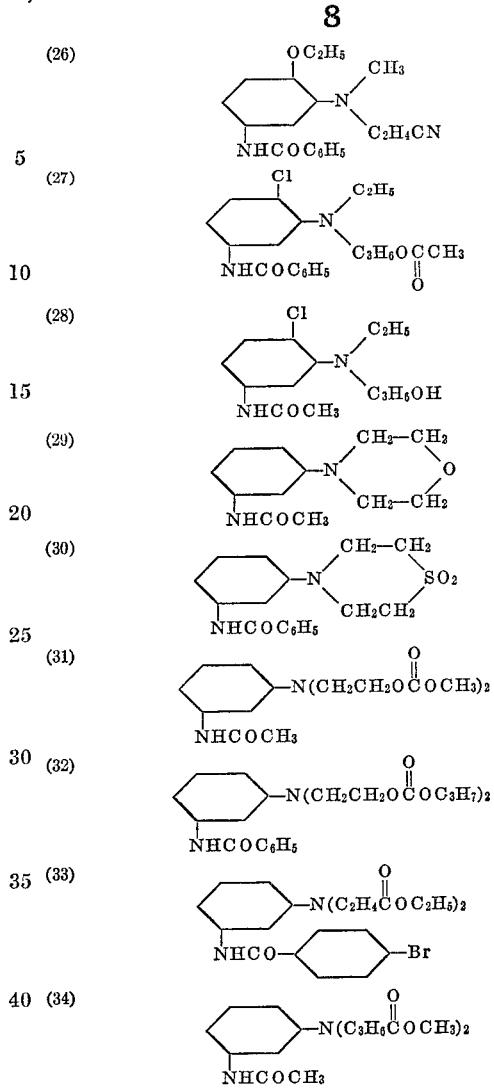

EXAMPLE IV (a) A disazo dye may be prepared as follows: (p-aminophenacyl)trimethylammonium chloride (22.8 parts) is diazotized as described in Example I and stirred gradually into a solution of 10.8 parts of m-toluidine in 5% aqueous hydrochloric acid. This is followed by the addition of sodium acetate to keep the pH at 1 to 2. The mixture is stirred at 10° C. for 5 hours and then at room temperature for 8 hours, salted by the addition of sufficient sodium chloride to give a 10% solution, and filtered; the residue is washed with 10% aqueous sodium chloride solution.

The orange filter cake is then dissolved in 1000 parts of water and 50 parts of 36% hydrochloric acid and re-diazotized in the same manner with 6.9 parts of sodium nitrite. After decomposing any excess nitrous acid by the addition of sulfamic acid, the resulting solution is added to a stirred solution of 24 parts of 3'-(dimethylamino)-benzanilide in 150 parts of 15% aqueous hydrochloric acid. Coupling of the reactants and isolation of the dye are carried out as described in Example II(a). The new dye has the structure

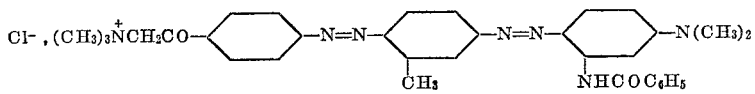

It is a dark powder, soluble in dilute acids from which it dyes polyacrylic fibers in red shades of very good light- and wash-fastness properties.

(b) Part (a) of this example may be repeated by replacing m-toluidine with equal molar amounts of substituted anilines selected from the following:

(1) 2-methoxy-5-methylaniline
(2) 2,5-dimethoxyaniline
(3) 2-bromoaniline
(4) 3-bromoaniline and
(5) 2,5-dichloroaniline and replacing 3'-(dimethylamino)benzanilide with equal molar amounts of the coupling components listed in Table I to give red to violet dyes of good dyeing and fastness properties.

(c) Each of the combinations in parts (a) and (b) of this example may be repeated by replacing (p-aminophenacyl)trimethylammonium chloride with equal molar amounts of the following diazo components:

(1) [2-(p-aminobenzoyl)]trimethylammonium chloride,
(2) [3-(p-aminobenzoyl)propyl]triethylammonium bromide,
(3) (p-amino-α-methylphenacyl)trimethylammonium chloride,
(4) (3-amino-4-methylphenacyl)trimethylammonium chloride,
(5) (3-amino-4-methoxyphenacyl)trimethylammonium chloride,
(6) (4-amino-2-chlorophenacyl)trimethylammonium chloride,
(7) (4-amino-2,5-dimethylphenacyl)trimethylammonium chloride,
(8) (p-aminophenacyl)pyridinium chloride,
(9) (p-aminophenacyl)benzyldimethylammonium chloride and
(10) (p-aminophenacyl)dimethyl(2-hydroxyethyl)ammonium chloride to give red to violet dyes of good dyeing and fastness properties.

The embodiments of the invention in which an exclusive property or privilege is claimed are defined as follows:

1. Cationic azo dyes of the formula:

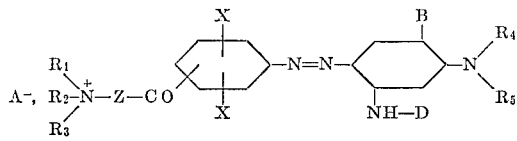

wherein:
$R_1$ is alkyl, $R_2$ is alkyl or hydroxyalkyl, $R_3$ is alkyl or benzyl, or any two of $R_1$, $R_2$ and $R_3$ together with the adjacent nitrogen atom form a pyridinium ring;
$A^-$ is a water-soubilizing anion;
$Z$ is an alkylene radical of 1 to 3 carbon atoms;
each $X$ is hydrogen, alkyl, alkoxy, chlorine or bromine;
$B$ is hydrogen, alkyl, alkoxy, chlorine or bromine;
$D$ is —CO—alkyl, —CO—phenyl, —$SO_2$—alkyl, —$SO_2$—phenyl, —$COCF_3$ or —$COCH_2Cl$, in which the phenyls may be substituted by up to two groups selected from alkyl, alkoxy, nitro and chlorine;
$R_4$ is hydrogen, alkyl, hydroxyalkyl, alkoxyalkyl, cyanoalkyl, acetoxyalkyl, acetylethyl, alkoxycarbonylalkyl or 2-(alkoxycarbonyloxy)ethyl;
$R_5$ is hydrogen, alkyl, hydroxyalkyl, alkoxyalkyl, cyanoalkyl, acetoxyalkyl, acetylethyl, alkoxycarbonylalkyl, 2-(alkoxycarbonyloxy)ethyl or phenyl;
or $R_4$ and $R_5$ together form a group selected from diethylene sulfone and diethylene ether;
all alkyl, hydroxyalkyl, cyanoalkyl, and alkoxy members are of 1 to 4 carbon atoms;
and the CO group in the diazo component is attached in the meta or para position with respect to the azo bridge.

2. A cationic azo dye of the formula:

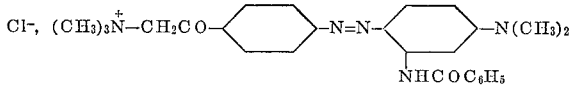

3. A cationic azo dye of the formula:

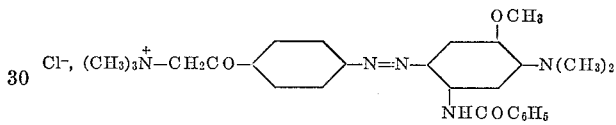

4. A cationic azo dye of the formula:

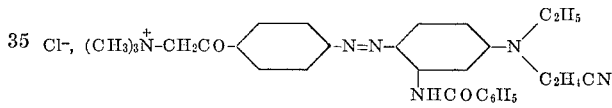

References Cited

UNITED STATES PATENTS

| | | | |
|---|---|---|---|
| 2,064,332 | 12/1936 | Zwilgmeyer | 260—152 X |
| 2,365,345 | 12/1944 | Kirby et al. | 260—199 X |
| 2,821,526 | 1/1958 | Boyd | 260—205 |
| 3,020,272 | 2/1962 | Sartori | 260—186 |
| 3,417,076 | 12/1968 | Sartori | 260—205 |

FOREIGN PATENTS 587,134   4/1957   Great Britain.

JOSEPH PAUL BRUST, Primary Examiner

D. M. PAPUGA, Assistant Examiner

U.S. Cl. X.R.

8—41, 54.2, 55; 260—152, 186, 187, 207.1, 243, 247.2, 295, 463, 465, 490, 556 559, 567.6